UNITED STATES PATENT OFFICE.

ARTHUR P. TANBERG, OF WILMINGTON, DELAWARE, AND HERBERT WINKEL, OF SCRANTON, PENNSYLVANIA, ASSIGNORS TO E. I. DU PONT DE NEMOURS & COMPANY, OF WILMINGTON, DELAWARE, A CORPORATION OF DELAWARE.

PROCESS OF PRODUCING TETRA-SUBSTITUTED UREAS.

No Drawing. Application filed September 11, 1918, Serial No. 253,565. Renewed May 5, 1921. Serial No. 467,084.

*To all whom it may concern:*

Be it known that we, ARTHUR P. TANBERG, of Wilmington, in the State of Delaware, and HERBERT WINKEL, of Scranton, county of Lackawanna, State of Pennsylvania, respectively, have invented a certain new and useful Improvement in Processes of Producing Tetra-Substituted Ureas, and do hereby declare that the following is a full, clear, and exact description thereof.

This invention relates to the production of symmetrical tetra-substituted ureas by the reaction of carbonyl chloride on secondary amines, and pertains particularly to a process of producing dialkyldiarylureas, such as, dimethyldiphenylurea, by treating an alkylarylamine dissolved in a suitable organic solvent with carbonyl chloride.

In the process heretofore used in preparing tetra-substituted ureas in which carbonyl chloride is used as one of the starting materials, it was seemingly considered necessary to first produce disubstituted carbamyl chloride, to isolate the latter, and then subject it to a further treatment to form the tetra-substituted urea. Thus in the old process of making dimethyldiphenylurea, methylaniline was treated with carbonyl chloride to form methylphenylcarbamyl chloride (so called methylphenylurea chloride), and the methylphenylcarbamyl chloride purified and converted into dimethyldiphenylurea either by treating it with alcoholic ammonia or by heating with zinc dust and an excess of methylaniline. An analysis of this old process will show that an additional molecule of carbonyl chloride is wasted for each molecule of carbonyl chloride which goes to form the urea.

One object of our invention is to provide a process whereby tetra-substituted ureas may be formed in one step, so as to avoid the trouble of isolating an intermediate product and to avoid the additional expense caused by the use of alcoholic ammonia or zinc dust and the extra amount of carbonyl chloride which is necessary in the old process.

We have discovered that by treating a secondary aromatic amine with the amount of carbonyl chloride which is theoretically required in the presence of a suitable organic solvent such as benzene, xylene, solvent naphtha, carbon tetrachloride, etc., the tetra-substituted urea may be obtained directly without isolating a disubstituted carbamyl chloride which may be formed as an intermediate product. The correct amount of carbonyl chloride which is necessary in our process may either be measured before hand or the conditions of the reaction may be so chosen that only the correct amount of carbonyl chloride will be absorbed by the secondary amine. We have found that by dissolving an alkylarylamine in a certain limited amount of organic solvent, such as benzene, carbonyl chloride may be passed into the solution heated to a certain temperature until it is no longer absorbed; by this operation the dimethyldiphenylurea is formed directly and may be isolated by distilling off the solvent and purifying the residue in any desired manner. The reaction is preferably carried on at an elevated temperature, by which we mean a temperature between 35 and 80° C. Although various changes and modifications of the process may be resorted to, one example is given as follows:—

A mixture of one part of monomethylaniline and one part of benzene is placed in a flask and heated to 70° C. Carbonyl chloride is then led in in the form of a gas and the introduction is continued until all evidence of reaction has ceased. This point is considered as reached when carbonyl chloride is no longer absorbed by the solution. The benzene is then distilled off and the residue of impure dimethyldiphenylurea is treated with dilute hydrochloric acid to remove such small amounts of monomethylaniline as may remain unchanged. The dimethyldiphenylurea is insoluble in the dilute acid and may therefore be filtered off and washed free from acid with water. The unchanged monomethylaniline may subsequently be recovered by suitable treatment of the wash liquors. In order to complete the purification of the dimethyldiphenylurea, the washed product may be crystallized from a suitable organic solvent.

The equation explaining the reaction is as follows:—

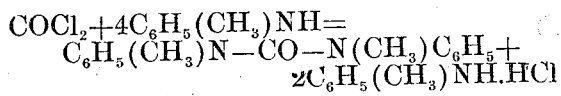

It will be noted that one molecule of carbonyl chloride is theoretically required for four molecules of the alkylarylamine, two molecules of the latter combining with two molecules of the hydrochloric acid which is formed to produce an alkylarylamine hydrochloride which is unable to react with carbonyl chloride.

While the proportions and conditions given in the above example are typical of the manner in which our process is carried out, it should be understood that the process is not limited to the exact proportions and conditions given in this example. Moreover the proportions of materials used, the rate of introduction of the carbonyl chloride, the temperature at which the mixture is maintained during the introduction of the carbonyl chloride, the nature of the solvent used for the monomethylaniline, and the process used for the purification of the crude product may be varied within more or less wide limits, and the example is given merely as an indication of one way in which the process may be carried out. As a solvent for the amine, instead of benzene any suitable organic solvent, such as carbon tetrachloride, xylene, solvent naphtha, etc., may be used, "suitable organic solvent" being intended to mean a solvent which does not react with carbonyl chloride, under the conditions of the process.

We claim:—

1. The process of producing tetra-substituted ureas which comprises passing carbonyl chloride into a secondary amine dissolved in an inert organic solvent, the amount of carbonyl chloride so introduced being about that theoretically required to form the tetra-substituted urea.

2. The process of producing tetra-substituted ureas which comprises passing carbonyl chloride into a secondary amine dissolved in a liquid aromatic hydrocarbon, the amount of carbonyl chloride so introduced being about that theoretically required to form the tetra-substituted urea.

3. The process of producing tetra-substituted ureas which comprises passing carbonyl chloride into a secondary amine dissolved in benzene, the amount of carbonyl chloride so introduced being about that theoretically required to form the tetra-substituted urea.

4. The process of producing tetra-substituted ureas which comprises passing carbonyl chloride into a secondary aromatic amine dissolved in an inert organic solvent, the amount of carbonyl chloride so introduced being about that theoretically required to form the tetra-substituted urea.

5. The process of producing tetra-substituted ureas which comprises passing carbonyl chloride into a secondary aromatic amine dissolved in a liquid aromatic hydrocarbon, the amount of carbonyl chloride so introduced being about that theoretically required to form the tetra-substituted urea.

6. The process of producing tetra-substituted ureas which comprises passing carbonyl chloride into a secondary aromatic amine dissolved in benzine, the amount of carbonyl chloride so introduced being about that theoretically required to form the tetra-substituted urea.

7. The process of producing tetra-substituted ureas which comprises passing carbonyl chloride into a secondary aromatic amine dissolved in an inert organic solvent, the amount of carbonyl chloride so introduced being about that theoretically required to form the tetra-substituted urea, and the temperature of the mixture being maintained at about 70° C.

8. The process of producing symmetrical dialkyldiarylureas which comprises passing carbonyl chloride into an alkylarylamine dissolved in an inert organic solvent, the amount of carbonyl chloride so introduced being about that theoretically required to form the tetra-substituted urea.

9. The process of producing symmetrical dimethyldiphenylurea which comprises passing carbonyl chloride into methylaniline dissolved in an inert organic solvent, the amount of carbonyl chloride so introduced being about that theoretically required to form the tetra-substituted urea.

10. The process of producing symmetrical dimethyldiphenylurea which comprises passing carbonyl chloride into methylaniline dissolved in benzene, the amount of carbonyl chloride so introduced being about that theoretically required to form the tetra-substituted urea.

11. The process of producing symmetrical tetra-substituted ureas which comprises inducing a reaction at an elevated temperature between one molecular proportion of carbonyl chloride and about four molecular proportions of a secondary amine in the presence of a liquid aromatic hydrocarbon, the amine and the hydrocarbon being present in about equal parts by weight.

12. The process of producing symmetrical polyarylureas which comprises inducing a reaction at an elevated temperature between one molecular proportion of carbonyl chloride and about four molecular proportions of a secondary aromatic amine in the presence of an inert organic solvent.

13. The process of producing symmetrical dialklydiarylureas which comprises inducing a reaction at an elevated temperature between one molecular proportion of carbonyl chloride and about four molecular proportions of an alkylarylamine in the presence of a liquid aromatic hydrocarbon.

14. The process of producing symmetrical dimethyldiphenylureas which comprises inducing a reaction at an elevated temperature between one molecular proportion of carbonyl chloride and about four molecular proportions of methylaniline in the presence of benzene.

15. The process of producing symmetrical dimethyldiphenylurea which comprises passing carbonyl chloride into methylaniline dissolved in about an equal weight of benzene until the carbonyl chloride is no longer absorbed by the solution, the temperature of the reacting mixture being maintained at about 70° C.

16. The process of producing tetra-substituted ureas which comprises passing carbonyl chloride into a secondary aromatic amine dissolved in benzene, the amount of carbonyl chloride so introduced being about that theoretically required to form the tetra-substituted urea, distilling off the benzene, washing the residue with dilute hydrochloric acid to remove secondary aromatic amine hydrochloride which may be present, and finally purifying the residue comprising the tetra-substituted urea by crystallization from a suitable solvent.

17. The process of producing symmetrical dimethyldiphenylurea which comprises passing carbonyl chloride into methylaniline dissolved in about an equal weight of benzene until the carbonyl chloride is no longer absorbed by the solution, the temperature of the reacting mixture being maintained at about 70° C., distilling off the benzene, washing the residue with dilute hydrochloric acid to remove methylaniline hydrochloride which may be present, and finally purifying the residue comprising the tetra-substituted urea by crystallization from a suitable solvent.

In testimony that we claim the foregoing we have hereunto set our hands.

ARTHUR P. TANBERG.
HERBERT WINKEL.

Witnesses:
R. L. ANDREAU,
E. M. FABER.